US008899960B2

(12) United States Patent  (10) Patent No.: US 8,899,960 B2
Heininger et al.  (45) Date of Patent: Dec. 2, 2014

(54) AIR SIDE PIVOT CASTING FOR MOLD CLAMPING LINKAGE SYSTEM

(75) Inventors: Ammon Heininger, New Freedom, PA (US); Larry M. Taylor, Landisville, PA (US); Marshall M. Miller, Wrightsville, PA (US)

(73) Assignee: Graham Packaging Company, L.P., York, PA (US)

( * ) Notice: Subject to any disclaimer, the term of this patent is extended or adjusted under 35 U.S.C. 154(b) by 1095 days.

(21) Appl. No.: 12/897,064

(22) Filed: Oct. 4, 2010

(65) Prior Publication Data

US 2012/0082750 A1 Apr. 5, 2012

(51) Int. Cl.
  *B29C 49/56* (2006.01)
  *B29C 33/22* (2006.01)
  *B29C 49/30* (2006.01)
  *B29C 49/04* (2006.01)

(52) U.S. Cl.
  CPC .............. *B29C 49/56* (2013.01); *B29C 49/30* (2013.01); *B29C 49/04* (2013.01); *B29C 33/22* (2013.01)
  USPC ........................................................ 425/541

(58) Field of Classification Search
  USPC .................................. 425/541, 472; 248/200
  See application file for complete search history.

(56) References Cited

U.S. PATENT DOCUMENTS

| | | |
|---|---|---|
| 2,750,625 A | 6/1956 | Colombo |
| 3,421,886 A | 1/1969 | Schelleng |
| 3,484,897 A | 12/1969 | Kovacs |
| 3,571,848 A | 3/1971 | Szajna |
| 3,589,163 A | 6/1971 | Byrne et al. |
| 3,764,250 A | 10/1973 | Waterloo |
| 3,869,237 A | 3/1975 | Hellmer et al. |
| 3,932,084 A | 1/1976 | Reilly |
| 4,046,498 A | 9/1977 | Appel et al. |
| 4,080,146 A | 3/1978 | Hellmer |
| 4,161,579 A | 7/1979 | Edelman et al. |

(Continued)

FOREIGN PATENT DOCUMENTS

| | | |
|---|---|---|
| CN | 200977723 | 11/2007 |
| DE | 102005029916 | 3/2007 |

(Continued)

OTHER PUBLICATIONS

International Search Report by the EPO mailed on Apr. 2, 2013 for International Application No. PCT/US2011/053874.

(Continued)

*Primary Examiner* — James Mackey
(74) *Attorney, Agent, or Firm* — Stradley Ronon Stevens & Young, LLP

(57) ABSTRACT

A pivot casting component used in an apparatus for extrusion blow molding polyethylene teraphthalate ("PET") is disclosed. The pivot casting is designed to provide increased strength and increased reliability over prior components with the blow mold clamping linkage system. Prior art pivot elements were designed and fabricated from separate elements such that weak points, and stress concentration points were created. Such weak points resulted in the pivot element being a weak component in the blow mold clamping linkage system. The inventive pivot casting is cast as a single component from higher strength materials, with an improved geometry to increase component strength, durability and overall system reliability. In a preferred embodiment, the air side pivot casting is formed from 80-55-06 ductile iron resulting in a 40% increase in tensile strength over prior pivot components.

20 Claims, 3 Drawing Sheets

(56) References Cited

U.S. PATENT DOCUMENTS

| | | |
|---|---|---|
| 4,419,063 A | 12/1983 | Heise |
| 4,507,072 A | 3/1985 | Gaul, Jr. |
| 4,522,608 A | 6/1985 | Joyner |
| 4,602,810 A | 7/1986 | Babb, Jr. et al. |
| 4,606,717 A | 8/1986 | Polak et al. |
| 4,648,831 A | 3/1987 | Johnson |
| 4,755,290 A | 7/1988 | Neuman et al. |
| 4,801,361 A | 1/1989 | Bullard et al. |
| 4,859,397 A | 8/1989 | Peters |
| 4,867,197 A | 9/1989 | Ritter et al. |
| 4,919,607 A | 4/1990 | Martin et al. |
| 4,943,228 A | 7/1990 | Reymann et al. |
| 4,946,366 A | 8/1990 | Dundas et al. |
| 4,984,977 A | 1/1991 | Grimminger et al. |
| 4,998,873 A | 3/1991 | Martin et al. |
| 5,078,948 A | 1/1992 | Troutman et al. |
| 5,551,862 A | 9/1996 | Allred, Jr. |
| 5,565,165 A | 10/1996 | Matsuhashi |
| 5,681,596 A | 10/1997 | Mills et al. |
| 5,698,241 A | 12/1997 | Kitzmiller |
| 5,705,121 A | 1/1998 | Allred, Jr. |
| 5,939,108 A | 8/1999 | Nobuyuki et al. |
| 5,948,346 A | 9/1999 | Mills et al. |
| 6,135,145 A | 10/2000 | Bolling |
| 6,345,973 B1 | 2/2002 | Nielsen |
| 6,352,123 B1 | 3/2002 | Schlegel et al. |
| 6,632,493 B1 | 10/2003 | Hildebrand, IV et al. |
| 6,787,073 B1 | 9/2004 | Tadler et al. |
| 7,611,657 B2 | 11/2009 | Klinedinst et al. |
| 7,766,645 B2 | 8/2010 | Legallais |
| 2006/0290033 A1 | 12/2006 | Purdel |
| 2007/0271761 A1 | 11/2007 | Haytayan |
| 2008/0069915 A1 | 3/2008 | Busse et al. |
| 2009/0085243 A1 | 4/2009 | Taylor et al. |
| 2011/0274528 A1* | 11/2011 | Cate et al. ............... 414/697 |

FOREIGN PATENT DOCUMENTS

| | | |
|---|---|---|
| EP | 1 273 417 A2 | 8/2003 |
| EP | 1 598 165 A1 | 11/2005 |
| EP | 2 008 784 | 12/2008 |
| EP | 2 030 757 | 3/2009 |
| GB | 2125145 | 2/1984 |
| JP | 62170314 | 7/1987 |
| JP | 2004-223816 | 8/2004 |
| JP | 2005-35060 | 2/2005 |
| JP | 2008-87856 | 4/2008 |
| WO | WO9203276 | 3/1992 |
| WO | 01/32388 A1 | 5/2001 |
| WO | 02/072334 | 9/2002 |
| WO | 2005/002742 A1 | 1/2005 |
| WO | WO2009/059091 | 5/2009 |

OTHER PUBLICATIONS

International Search Report for International Application No. PCT/US2011/054667 issued by the European Patent Office with a mailing date of Jan. 27, 2012.

International Search Report for International Application No. PCT/US2011/054678 issued by the European Patent Office with a mailing date of Feb. 17, 2012.

* cited by examiner

AIR SIDE PIVOT CASTING FOR MOLD CLAMPING LINKAGE SYSTEM

FIELD OF THE INVENTION

The invention generally relates to extrusion blow molding and extrusion blow molding devices. More particularly, the disclosed invention relates to an apparatus for extrusion blow molding polyethylene teraphthalate ("PET"), and more specifically relates to an air side pivot casting element used in an apparatus for extrusion blow molding PET.

BACKGROUND OF THE INVENTION

Polymer resins, such as polyethylene terephthalate, are widely used in the packaging industry. PET is a linear, thermoplastic polyester resin. The advantages of PET include toughness, clarity, good barrier properties, light weight, design flexibility, chemical resistance, and good shelf-life performance. Furthermore, PET is environmentally friendly because it can often be recycled. These characteristics of PET make it a popular material in the manufacturing of containers, for example, beverage bottles.

There are a variety of production methodologies to produce PET containers. For example, injection stretch blow molding is commonly used to make PET bottles. Of the various methodologies, one-piece PET containers having an integrated handle are commonly formed using extrusion blow molding (EBM). The EBM process includes extruding a polymer resin in a softened state through an annular die to form a molten hollow tube or parison. The molten parison is placed in a hollow blow mold having a cavity corresponding to the desired shape of the container being formed. Air is injected to inflate the parison against the interior walls of the blow mold. Upon contact with the walls, the parison cools rapidly and assumes the shape of the mold.

PET manufacturers have developed different grades or versions of PET that are more suitable for use in EBM methods. Such extrusion grade PET or "EPET" has a higher molecular weight that standard PET, and has an inherent viscosity of 1.0 dl/g or greater as measured by solution viscosity. Importantly, the molding forces associated with forming EPET containers are higher than the molding forces developed during the forming of PET containers.

One type of rapid EBM method used to from EPET containers uses a blow mold apparatus that has the capacity of forming approximately 100 containers per minute. This type of blow mold machine may be configured with a rotating vertical wheel such that the wheel is configured with circumferentially spaced mold halves. The mold halves each capture a vertical, continuously growing parison at an extrusion station. In one example blow mold apparatus the flow head extruding the parison moves up and away from the mold halves after the mold halves close to capture the parison. The parison is severed adjacent to the top of the mold halves, the mold halves then move away from the extrusion station, and a top blow pin is moved into the end of the captured parison at the top of the mold halves to seal the mold cavity and blow the parison. The flow head and dependent parison are then lowered back into the initial position so that the new parison is in position to be captured by the next pair of mold halves.

The blown parison cools as the wheel and mold halves rotate. At the appropriate mold ejection station, the mold halves open and the finished container is ejected from between the mold halves. In normal operation, the rotary wheel apparatus is capable of producing approximately 110 containers per minute using a 22 position mold machine and a rotation rate of 5 RPM.

EBM processes, and especially those forming EPET containers, often develop very high mold clamp forces. Because the mold clamp forces are transmitted through the system linkages, any weak element or component in the linkage may result in stress failures or deformation in the element. One such element in the system linkage is a pivot element that transmits the control forces between the two mold halves that are connected by a series of actuator rods, angle links, and yokes. Any deformation or stress failures in the pivot element could cause increased system fatigue, mold misalignment, or even system failure. Such fatigue problems resulting from high clamp forces are a problem impeding the reliability and durability of EBM systems.

Accordingly, there is a need to improve those weak linkage points in EBM apparatus to ensure reliability and consistent container results. Such improvements have not been previously incorporated into such EBM machines, including those forming EPET containers. The inventive pivot element described below is such an improved linkage element having higher strength and increased reliability.

SUMMARY OF THE INVENTION

The above noted problems, which are inadequately or incompletely resolved by the prior art are completely addressed and resolved by the invention.

A preferred aspect of the invention is a pivot casting for use in a blow mold clamping linkage system, comprising a single element cast using iron having a tensile strength of at least 65,000 pounds per square inch, and a yield strength of at least 45,000 pounds per square inch; and at least one pivot aperture for receiving at least one pivot bushing, and to which a pivot link is rotatably connected. A particular embodiment of the invention is a pivot casting for use in a blow mold clamping linkage system, wherein the iron used to form the pivot casting is 80-55-06 ductile iron.

Another particular embodiment of the invention is a pivot casting for use in a blow mold clamping linkage system, comprising a single element cast using iron having a tensile strength of at least 65,000 pounds per square inch, and a yield strength of at least 45,000 pounds per square inch, further comprising two contiguous support elements formed along the pivot casting.

A further preferred embodiment of the invention is a linkage apparatus for use in a blow mold clamping system, comprising blow mold halves movably connected to an actuation component to control opening and closing of said blow mold halves; and a pivot casting linked between said blow mold halves and said actuation component, wherein said pivot casting comprises a single element cast using iron having a tensile strength of at least 65,000 pounds per square inch, and a yield strength of at least 45,000 pounds per square inch.

Still another preferred embodiment of the invention is a blow mold clamping system, comprising blow mold halves, an actuation component to control the opening and closing of said blow mold halves, and a plurality of linkage components connecting said actuation component to said blow mold halves, wherein one of said linkage components comprises a pivot casting linked between said blow mold halves and said actuation component, and said pivot casting comprises a single element cast using iron having a tensile strength of at least 65,000 pounds per square inch, and a yield strength of at least 45,000 pounds per square inch.

The invention will be best understood by reading the following detailed description of the several disclosed embodiments in conjunction with the attached drawings that are briefly described below.

BRIEF DESCRIPTION OF THE DRAWINGS

The invention is best understood from the following detailed description when read in connection with the accompanying drawings. It is emphasized that, according to common practice, the various features of the several drawings are not to scale, and the invention is not limited to the precise arrangement as may be shown in the accompanying drawings. On the contrary, the dimensions and locations of the various features are arbitrarily expanded or reduced for clarity, unless specifically noted in the attached claims.

DETAILED DESCRIPTION OF PREFERRED EMBODIMENTS

Figure 1:
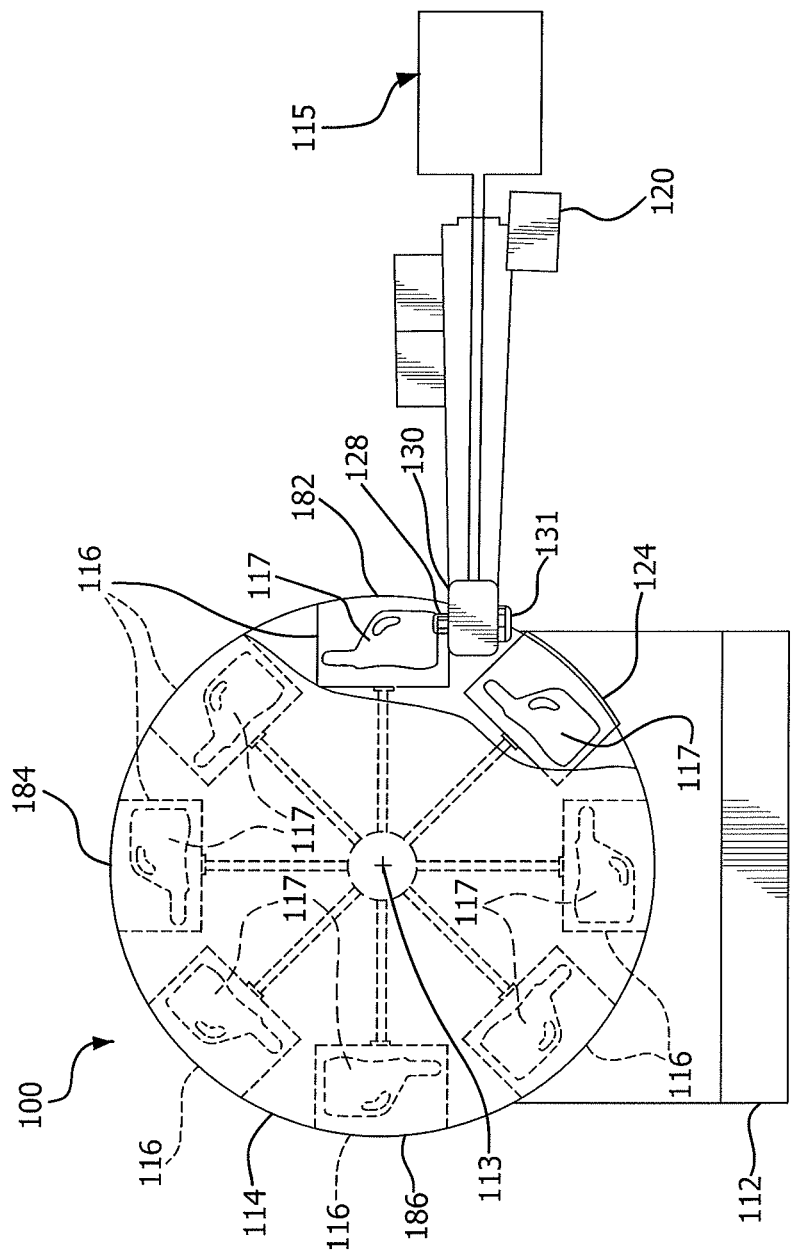
FIG. 1: is a side view illustration of an example vertical rotary blow mold machine.

The invention is a pivot casting component used in an apparatus for extrusion blow molding PET, and more particularly for blow molding extrusion grade PET, or EPET. The pivot casting is designed to provide increased strength and increased reliability over prior art components with the blow mold clamping linkage system. The pivot casting may be an element in vertical wheel-type continuous extrusion blow molding machine. Referring to the drawings, in which like reference numbers refer to like elements throughout the various figures that comprise the drawings, FIG. 1 shows a vertical rotating blow molding machine 100. The machine 100 includes a rotatable wheel 114, supported on a base 112, and an extruder 115.

The wheel 114 has a plurality of in-line molds 116, each mold 116, preferably located at the perimeter of the wheel 114, and having an identical inner cavity 117 defining a container. A typical rotary blow molding machines 100 may have from 6 to 30 molds, but may have any number of molds that fit around the wheel 114. The in-line molds 116 are mounted on the wheel 114, for rotation about a horizontally disposed rotational axis 113. The in-line molds 116 each preferably have a pair of mold halves 116a and 116b, shown in FIG. 2, that split the respective inner cavities 117 and that open and close at various stations during rotation about the rotational axis 113 consistent with operation of a conventional wheel-type extrusion blow molding apparatus.

Figure 2:
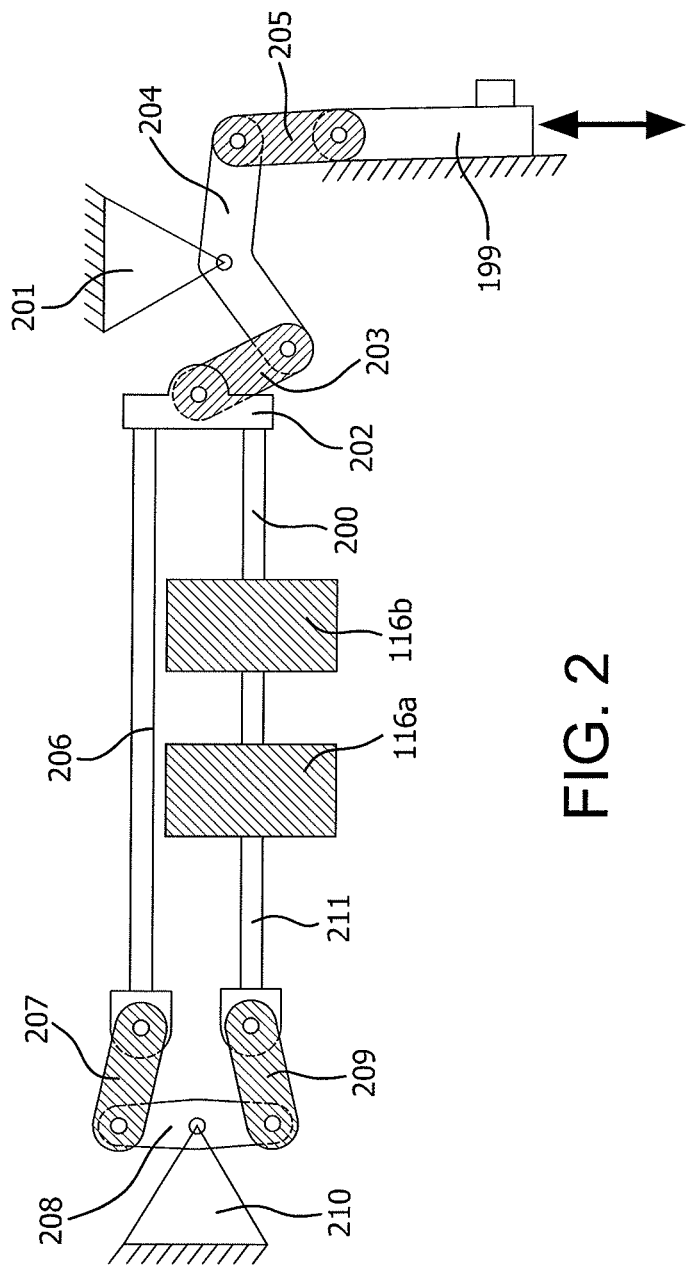
FIG. 2: is a top view illustration of a vertical rotary blow mold machine showing the wheel linkage system components.

FIG. 2 shows, in a preferred embodiment, the elements of the linkage system that may be used in a blow mold machine 100. The mold halves 116a and 116b, shown in FIG. 2 in an open position. The molds 116 are linked to a cam follower 199 via a linkage system. The linkage system includes as primary elements, a pivot bracket 201, a bridge link or yoke 202, an angle link 204, an actuator rod 206, a pivot link 208, and a pivot casting 210. Each of these elements is interconnected to control the opening and closing of the mold halves 116a and 116b as the cam follower 199 moves. More particularly, as shown in FIG. 2, cam follower 199 is connected to angle link 204 via cam link 205. As cam follower 199 moves angle link rotates about pivot bracket 201.

Angle link 204 is connected to bridge link 202 via cam link 203. Because bridge link 202 is connected to mold half 116b by guide rod 200, as bridge link 202 translates left or right, as shown in FIG. 2, mold half 116b also translate left, to close, or right, to open. Bridge link 202 is also connected to transfer or actuator rod 206, which in turn is connected to pivot link 208 via station link 207. Pivot link 208 is rotatably connected to pivot casting 210, and is also connected to compression shaft 211 via station link 209. Finally, compression shaft 211 is connected to the other mold half 116a. Given the rotational and translation interconnections between the linkage system elements, as cam follower 199 translates or moves, the mold halves 116a and 116b open and close as the wheel 114 rotates through the various positions and stations necessary to form a container 10.

Each of the linkage system elements is designed to operate within certain tolerances, and to accept certain forces necessary to form a container 10. If an element is fatigued or stressed, and such an element deforms or fails, then the manufacturing process ceases to operate. To ensure reliability and continued operation, weak elements in the linkage system should be improved or made more robust. One such element in prior art blow mold machine linkage systems has been the pivot element connected to pivot link 208. Prior art pivot elements were welded or manufactured from separate pieces. Such a welding process was often dependent upon the skill of the welder, and could result in stress points or weak points at the welds.

Figure 3:
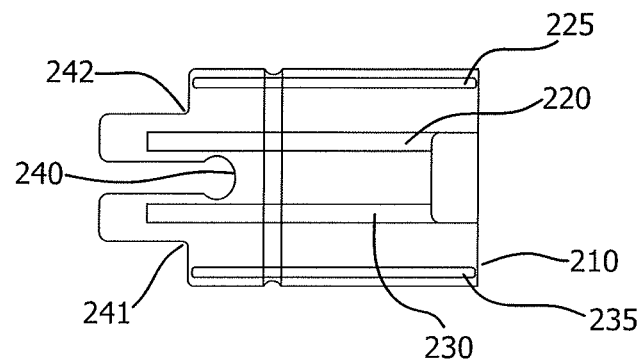
FIG. 3: is a top view illustration of an embodiment of the invention pivot casting.
Figure 4:
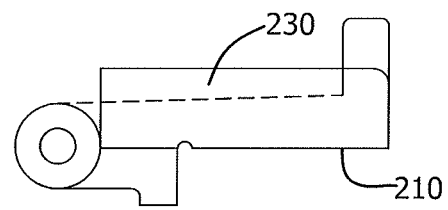
FIG. 4: is a side view illustration of an embodiment of the invention pivot casting.
Figure 5:
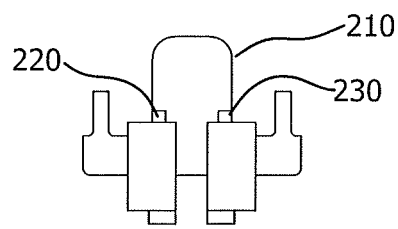
FIG. 5: is a bottom view illustration of an embodiment of the invention pivot casting.

FIGS. 3, 4 and 5 show detailed illustrations of an embodiment of the inventive pivot casting 210 that is manufactured as a single, contiguous element. The pivot casting 210 is, in a preferred embodiment made from, or cast from ductile iron. One example of such material is 80-55-06 ductile iron that results in the pivot casting has tensile strength of 80,000 pounds per square inch ("psi") and a yield strength of 55,000 psi. By way of example and comparison to a pivot casting 210 made of 80-55-06 ductile iron, a prior art pivot element would often be manufactured from 1020 carbon steel. Such a piece would have tensile strength of approximately 57,000 psi and a yield strength of approximately 42,000 psi. As such, the inventive pivot casting 210 manufactured from 80-55-06 ductile iron shows a 40% increase in tensile strength and a 29% increase in yield strength. In addition to 80-55-06 ductile iron, other types of high strength ductile iron may also be used to manufacture pivot casting 210.

As shown in FIGS. 3, 4 and 5, pivot casting 210 is cast as a single or contiguous piece, thereby alleviating stress or weak points created in prior art welding process. Moreover, because pivot casting 210 is cast, consistency between pieces formed in the casting process is more readily achieved. In addition to pivot casting 210 being a single piece, resulting in higher strength, the geometry of the casting also makes the element stronger. Specifically, buttress supports 220, 225, 230, and 235 are formed in the pivot casting 210 and extend along the length of pivot casting 210. Such supports 220, 225, 230, and 235 strengthen the pivot casting 210 while still permitting the casting to have a lower profile and less weight. With four supports 220, 225, 230, and 235, the balance of pivot casting 210 moment of inertia is improved, thereby reducing potential twisting of the element. The two interior supports 220 and 230 are designed to resist deflection of the pivot casting 210, and accordingly make the pivot casting 210 stiffer. With the gussets 220 and 230, the pivot casting provides a more stable location for the pivot point, and results in more consistent pressure on the mold clamp elements. The two interior gussets 220 and 230 are shorter in height to permit other linkage elements to move without impacting the pivot casting 210. The two outer gussets 225 and 235 are taller to increase stiffness of the pivot casting 210.

As also shown in FIG. 3, the pivot casting 210 may be manufactured with certain cut outs to reduce weight. The edges of the pivot casting 210, where such material is cut out, including edges 240, 241, and 242, are made with a circular geometry to reduce stress concentration points which may form if straight corners were formed. In a preferred embodiment of the pivot casting 210, as illustrated in FIGS. 3, 4 and 5, the weight of the casting is reduced approximately 20% from prior designed welded pivot elements. Accordingly, the inventive pivot casting 210 exhibits higher strength, higher durability, reliability and field use consistency, as compared to prior steel pivot elements, and still has lower weight that prior designed welded pivot pieces.

The above detailed description teaches certain preferred embodiments of the inventive pivot casting element used within a blow mold linkage system. As described, the inventive pivot casting provides high strength and durability, as well as high reliability and consistency, because the pivot casting is manufactured as a single, contiguous element made from high strength ductile iron. While preferred embodiments of the pivot casting have been described and disclosed, it will be recognized by those skilled in the art that various modifications and/or substitutions are possible. All such modifications and substitutions are intended to be within the true scope and spirit of the invention as disclosed. It is likewise understood that the attached claims are intended to cover all such modifications and/or substitutions.

What is claimed is:

1. A linkage apparatus for use in a blow mold clamping system, comprising:
   blow mold halves movably connected to an actuation component to control opening and closing of said blow mold halves; and
   a pivot casting linked between said blow mold halves and said actuation component, wherein said pivot casting comprises a single element cast using iron having a tensile strength of at least 65,000 pounds per square inch, and a yield strength of at least 45,000 pounds per square inch.

2. The linkage apparatus for use in a blow mold clamping system, as provided in claim 1, wherein the pivot casing iron is 80-55-06 ductile iron.

3. The linkage apparatus for use in a blow mold clamping system, as provided in claim 1, wherein the pivot casting iron is high strength ductile iron.

4. The linkage apparatus for use in a blow mold clamping system, as provided in claim 1, wherein the pivot casting further comprises at least one contiguous support element formed along the pivot casting.

5. The linkage apparatus for use in a blow mold clamping system, as provided in claim 1, wherein the pivot casting further comprises two contiguous support elements formed along the pivot casting.

6. A blow mold clamping system, comprising:
   blow mold halves;
   an actuation component to control the opening and closing of said blow mold halves; and
   a plurality of linkage components connecting said actuation component to said blow mold halves, wherein one of said linkage components comprises a pivot casting linked between said blow mold halves and said actuation component, and said pivot casting comprises a single element cast using iron having a tensile strength of at least 65,000 pounds per square inch, and a yield strength of at least 45,000 pounds per square inch.

7. The blow mold clamping system, as provided in claim 6, wherein the pivot casing iron is 80-55-06 ductile iron.

8. The blow mold clamping system, as provided in claim 6, wherein the pivot casing iron is high strength ductile iron.

9. The blow mold clamping system, as provided in claim 6, wherein the pivot casting further comprises at least one contiguous support element formed along the pivot casting.

10. The blow mold clamping system, as provided in claim 6, wherein the pivot casting further comprises two contiguous support elements formed along the pivot casting.

11. A blow mold machine comprising;
    blow mold halves;
    a cam follower;
    and a linkage system comprising interconnected elements to control the opening and closing of said mold halves as said cam follower moves, wherein said interconnected elements include a pivot bracket supporting an angle link which links the cam follower and a yoke, the yoke linked to one mold half and linked to the other mold half through an actuator rod linked to a pivot link supported by a pivot casting,
    wherein said pivot casting comprises a single element cast using iron having a tensile strength of at least 65,000 pounds per square inch, and a yield strength of at least 45,000 pounds per square inch.

12. The blow mold machine, as provided in claim 11, wherein the pivot casting iron is 80-55-06 ductile iron.

13. The blow mold machine, as provided in claim 11, wherein the pivot casting iron is high strength ductile iron.

14. The blow mold machine, as provided in claim 11, wherein the pivot casting further comprises at least one contiguous support element formed along the pivot casting.

15. The blow mold machine, as provided in claim 11, wherein the pivot casting further comprises two contiguous support elements formed along the pivot casting.

16. The blow mold machine, as provided in claim 15, wherein the contiguous support elements comprise buttress supports.

17. The blow mold machine, as provided in claim 11, wherein the pivot casting further comprises two contiguous interior support elements and two contiguous exterior support elements formed along the pivot casting.

18. The blow mold machine, as provided in claim 11, wherein the pivot casting further comprises cutouts to reduce the weight of the pivot casting.

19. The blow mold machine, as provided in claim 18, wherein the cutouts are made with a circular geometry to reduce stress concentration points.

20. The blow mold machine, as provided in claim 11, further comprising:
    a cam link connecting the angle link to the cam follower;
    a bridge link connecting the angle link to the yoke;
    a guide rod connecting the yoke to the one mold half;
    a first station link connecting the actuator rod and the pivot link; and
    a second station link connecting the pivot link to a compression shaft connected to the other mold half.

* * * * *